US009792470B2

(12) United States Patent
Kawaguchi et al.

(10) Patent No.: US 9,792,470 B2
(45) Date of Patent: Oct. 17, 2017

(54) INTERFERENCE DETECTION AND MITIGATION IN RFID READERS AND SYSTEMS

(71) Applicant: Intelleflex Corporation, Santa Clara, CA (US)

(72) Inventors: Dean Kawaguchi, San Jose, CA (US); Edward M. Farrell, Saratoga, CA (US); Prasad Panchalan, San Jose, CA (US); Manu H. R. Rao, Fremont, CA (US)

(73) Assignee: ZEST LABS, INC., San Jose, CA (US)

(*) Notice: Subject to any disclaimer, the term of this patent is extended or adjusted under 35 U.S.C. 154(b) by 644 days.

(21) Appl. No.: 13/852,961

(22) Filed: Mar. 28, 2013

(65) Prior Publication Data

US 2013/0257598 A1    Oct. 3, 2013

Related U.S. Application Data

(60) Provisional application No. 61/617,594, filed on Mar. 29, 2012.

(51) Int. Cl.
*H04Q 5/22*  (2006.01)
*G06K 7/10*  (2006.01)
*H04B 5/00*  (2006.01)

(52) U.S. Cl.
CPC ..... *G06K 7/10069* (2013.01); *G06K 7/10168* (2013.01); *H04B 5/0062* (2013.01)

(58) Field of Classification Search
USPC ........................................ 340/10.2
See application file for complete search history.

(56) References Cited

U.S. PATENT DOCUMENTS

| | | | |
|---|---|---|---|
| 7,202,784 B1* | 4/2007 | Herwig | 340/568.1 |
| 2006/0022815 A1* | 2/2006 | Fischer et al. | 340/505 |
| 2006/0098765 A1* | 5/2006 | Thomas | H04B 1/525 375/346 |
| 2007/0063818 A1* | 3/2007 | Witherspoon | G06K 7/10356 340/10.1 |
| 2007/0222609 A1* | 9/2007 | Duron | G06K 7/0008 340/572.7 |
| 2008/0220786 A1* | 9/2008 | Beacham | 455/450 |
| 2008/0298481 A1* | 12/2008 | Rofougaran et al. | 375/260 |
| 2009/0066480 A1* | 3/2009 | Koo et al. | 340/10.1 |
| 2009/0325486 A1* | 12/2009 | Kim | 455/41.2 |
| 2010/0141395 A1* | 6/2010 | Nagai | G06K 7/0008 340/10.4 |
| 2010/0302005 A1* | 12/2010 | Popovski | H04W 16/14 340/10.1 |

* cited by examiner

*Primary Examiner* — Brian Zimmerman
*Assistant Examiner* — Thomas McCormack
(74) *Attorney, Agent, or Firm* — Zilka-Kotab, P.C.

(57) ABSTRACT

One embodiment of the present invention includes a Radio Frequency Identification (RFID) reader configured to detect radio frequency (RF) interference in and/or outside a band of RFID operation. The RFID reader includes a receive channel for receiving incoming RF signals; and hardware for detecting interference in and/or outside a band of RFID operation. A method for mitigating radio frequency (RF) interference in and/or outside a band of RFID operation, according to one embodiment, includes detecting interference in and/or outside a band of RFID operation; and controlling an aspect of operation of the RFID reader for mitigating the detected interference.

19 Claims, 3 Drawing Sheets

INTERFERENCE DETECTION AND MITIGATION IN RFID READERS AND SYSTEMS

RELATED APPLICATIONS

This application claims priority to U.S. Provisional Patent Application No. 61/617,594, filed Mar. 29, 2012, which is herein incorporated by reference.

FIELD OF THE INVENTION

The present invention relates to Radio Frequency (RF) systems, and more particularly, this invention relates to Radio Frequency Identification (RFID) systems, methods and products having interference detection and mitigation.

SUMMARY

One embodiment of the present invention includes a Radio Frequency Identification (RFID) reader configured to detect radio frequency (RF) interference in and/or outside a band of RFID operation. The RFID reader includes a receive channel for receiving incoming RF signals; and hardware for detecting interference in and/or outside a band of RFID operation.

A method for mitigating radio frequency (RF) interference in and/or outside a band of RFID operation, according to one embodiment, includes detecting interference in and/or outside a band of RFID operation; and controlling an aspect of operation of the RFID reader for mitigating the detected interference.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Unless otherwise noted herein, particular components and/or steps of the inventive embodiments may be of a type known in the art.

One general embodiment of the present invention includes a Radio Frequency Identification (RFID) reader configured to detect radio frequency (RF) interference in and/or outside a band of RFID operation. The RFID reader includes a receive channel for receiving incoming RF signals; and hardware for detecting interference in and/or outside a band of RFID operation.

According to another general embodiment, a method for mitigating radio frequency (RF) interference in and/or outside a band of RFID operation includes detecting interference in and/or outside a band of RFID operation; and controlling an aspect of operation of the RFID reader for mitigating the detected interference.

Figure 1:
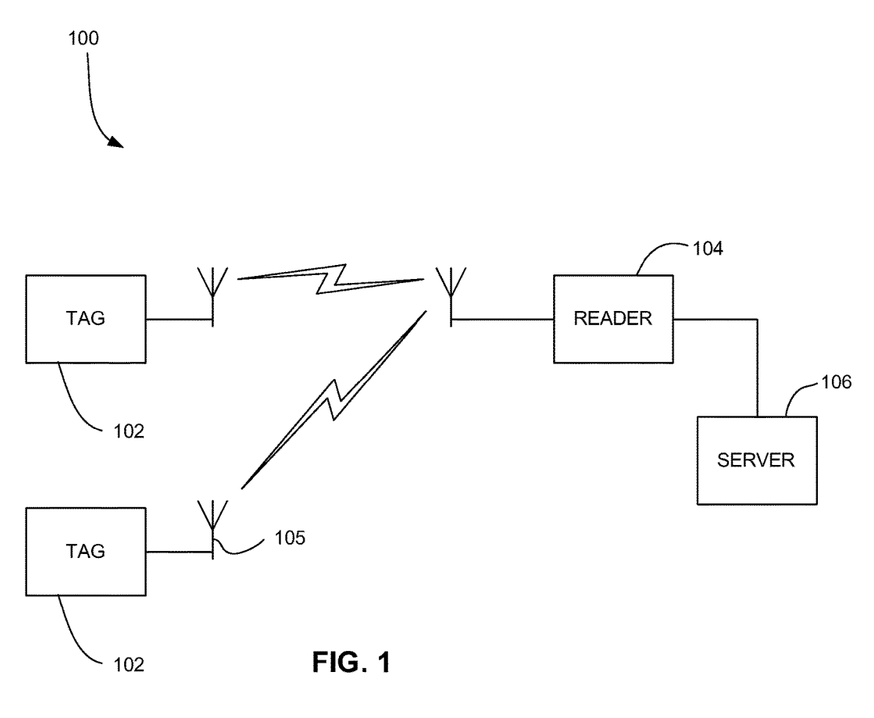
FIG. 1 is a system diagram of an RFID system.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator and/or transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably a GS1 EPC code. The EPC is a simple, compact, globally unique identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
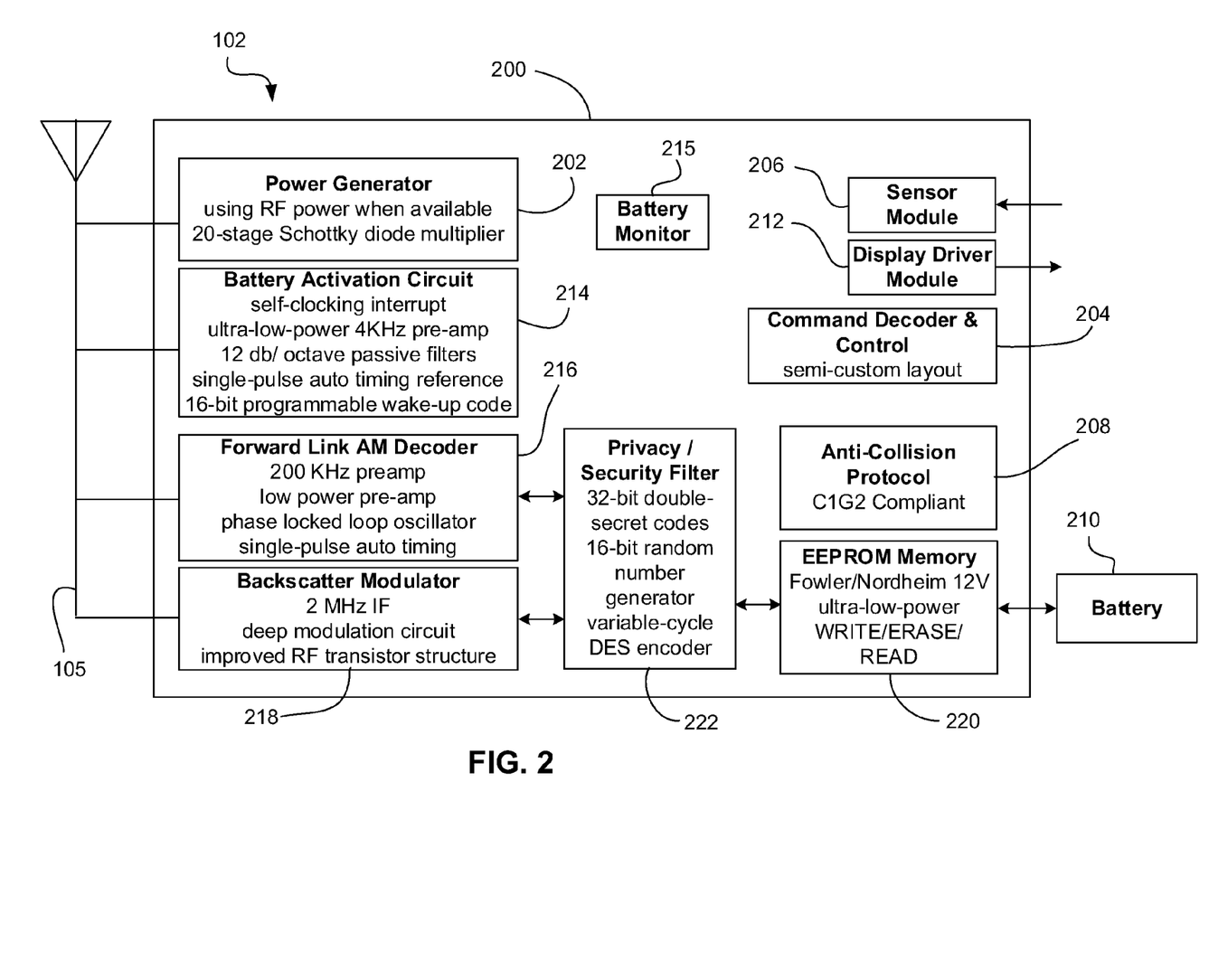
FIG. 2 is a system diagram for an illustrative integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor or sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 μA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

Passive and battery assisted passive (BAP) RFID tags that conform to EPC Global C1G2 and ISO 18000-6:2010 lack any frequency selectivity. Without frequency selectivity, signals within the bandwidth of the RFID tag due to antenna and chip tuning on the tag will be received with essentially no filtering. Thus, any strong interferer in the band, even if it is on a different tuning channel from the reader, has the potential to cause the tag to miss a reader command.

In various approaches, RFID tags may function in a frequency range from about 850 MHz to about 960 MHz, but could be higher or lower based on the preferred embodiment. However, there are other devices which operate in frequency ranges which overlap that mentioned above for the RFID tags which may therefore negatively affect RFID communications.

The type of device most likely to cause interference is another RFID reader, but there are still others which may also cause interference, such as electric meters and cordless phones that share the about 902 MHz to about 928 MHz ISM band. There are many licensed users close to the ISM band, the most prevalent being cell phones which have an uplink range of about 824 MHz to about 849 MHz, and a downlink range of about 869 MHz to about 894 MHz in the USA. Furthermore, Lojack transmitters operate at about 931 MHz, and also use very high transmitter power. Moreover, cell phone towers may also unfavorably share bandwidth values with the RFID tags, as they transmit continuously.

There are also similar bands in Europe, Asia, and Australia which cause interference problems. Furthermore, there are very powerful licensed transmitters working in adjacent bands that limit RFID reliability.

Moreover, passive RFID tags have very low sensitivity (e.g., about −18 dBm, but could be higher or lower) so they are generally less affected by interference than BAP RFID tags which have much better sensitivity (e.g., about −43 dBm, but could be higher or lower). BAP RFID tags are therefore more susceptible to interference, and the reader may preferably take into account any interference above −50 dBm. In one illustrative example, cell phone towers produce about 10 W; and at distances at about 1 km, their signal levels may most likely be above −50 dBm.

This interference may be a problem even when the interferer frequency is separated from the reader signal frequency by tens of MHz, also referred to as "wideband interference" on the forward link.

In contrast, the receiver in the readers have much lower (better) signal sensitivity than the tags, particularly RFID readers that are intended for use with BAP tags. According to one approach, the signal to interference ratio may preferably be at least 10 dB; therefore according to an illustrative example, if the sensitivity of Intelleflex readers are better than −120 dBm at the lowest data rates, the interference (e.g., reader to reader interference, 900 MHz ISM devices, etc.) could disrupt communication at levels down to −130 dBm if the interferer frequency is centered exactly where the backscatter is sent. Higher data rates have less sensitivity and thus interference may be tolerated at correspondingly higher levels but it is still very sensitive, e.g. about −108 dBm.

Readers typically use oscillators to tune to a specific channel at any given time and employ a variety of band pass and low pass frequency filters to reduce any signals outside of the selected channel. However, due to the extremely low level of backscatter signals from BAP tags and the spectral "splatter" due to modulation in interfering readers, any interferer that is on the same or adjacent channels could cause loss of reception of the backscatter signal, also referred to this as "narrowband interference" on the reverse link.

The most common source of reverse link interference is, again, caused by other readers. There are also passive radiators such as fluorescent light bulbs which may cause backscatter interference with frequencies in the range that could cause loss of reception of the tag backscatter signal.

There are two different links in RFID communication, the forward (downlink from reader) and reverse (uplink from tag). Each link has a different level of sensitivity to interference and the center frequency of the interferer; thus, it is preferable to attain two different types of interference detection. For example, the forward link may be susceptible to signals up to about 50 MHz away but only at levels at about −50 dBm or higher. In another approach, the reverse link may be susceptible to only about 1 MHz away from the channel in use by the reader, but may lose backscatter reception with interference as low as −130 dBm.

Several embodiments provided herein describe and/or suggest methods to detect RF interference in RFID systems. Moreover, embodiments of methods herein use the knowledge of interference and its measurable characteristics to adjust the operation of an RFID reader to maximize performance. According to various approaches, the "wideband interference" detection may be implemented in a variety of methods.

Detection of Wideband Interference in RFID Readers

The "wideband interference" detection may be implemented in a variety of ways.

According to one illustrative embodiment, a method may include one or more wideband power detectors which may receive the full bandwidth of the receiver. Because the level required to detect wideband interference in the forward link is higher, e.g. −50 dBm, the wider noise bandwidth may be acceptable.

The wideband detector may use an analog power detector in the receive path which may preferably be placed before the RF bandpass filter so the interference may be detected in the way most similar to that which the tag sees the interference. For example, the power detector may receive the power it is detecting from a splitter or coupler at a position prior to the RF bandpass filter. However, in another approach, the analog power detector may alternatively be placed after the RF bandpass filter. Placing the detector in front of the RF bandpass filter allows detection of interference in a much wider bandwidth, but may make it less sensitive because typically there is no signal amplifier in that part of the chain. Alternatively, placing the detector after the RF bandpass filter would allow amplification in a low noise amplifier prior to the detector. Additionally, the output of the analog detector may be sampled by low speed analog to digital converters (A/D's) nearly independent of the primary operation of the reader. The output of the A/D's may be sent to a processor of the reader, and/or off-reader, for further processing in a manner known in the art.

In one illustrative embodiment, during the gaps in time that the reader is not transmitting, the wideband interference detector may be monitoring for interference.

However, the foregoing wideband interference detection method incorporates the power levels, thereby making it difficult to detect the interference frequency. Therefore, approaches including spectrum analyzers and/or devices designed to act as spectrum analyzers may be implemented in the band of interest to determine if the interference is actually within the band. Moreover, narrowband power detectors may be implemented to determine the interference frequency.

According to another illustrative embodiment, a method may incorporate narrowband power detectors that are swept over the band of interest, which may preferably be able to detect the frequency of interest. In another approach, a receiver in the reader may be used to sweep through the band of the channel and measure the corresponding power level. The sweeping may be continuous or at steps, e.g., of 1 kHz, 10 kHz, 100 kHz, etc. or any other step value which would be apparent to one skilled in the art upon reading the present description.

The outputs of the narrowband power detectors may be sampled by A/D's to monitor the levels of interference over time, or a threshold comparator may be implemented to signal when interference is detected above a certain level. Narrowband power detection may be implemented in a reader using the same RF circuitry used for RFID communication to tags, but placed into a monitoring (e.g., listening only) mode while the synthesizer is swept across the potential interference band.

In yet another embodiment, a method may use one or more high speed A/D's to capture a digital sample stream of the received signal which, after Fourier Transform processing, produces a power spectral density of the RF signal environment. According to various approaches, the A/D+s may include single rail or complex architecture, based on the desired embodiment.

Detection of Narrowband Interference in RFID Readers

"Narrowband interference" detection may preferably monitor the channels up to about 1 MHz away, but preferably also at very low levels since interference as low as −130 dBm may affect reader sensitivity. Since the reader is already highly sensitive and tunable, the narrowband interference detection may be implemented by processing a wider band around the channel of interest to measure any interference. This embodiment may be performed continuously, even during RFID operation. According to the approach, the RF circuitry is preferably the same as the RFID reader but the output of the A/D's may be processed in a different section of the digital signal processor for interference monitoring.

In another approach, the narrowband interference detection may be conducted by periodically sweeping over some predetermined range, e.g., up to about ±10 MHz, more preferably about ±1 MHz, around the channel of interest and measuring any changes in signal level.

Monitoring all of the "narrowband interference" in the entire RFID band beyond some predetermined value, e.g., at least about ±100 kHz away, more preferably within about 1 MHz away, enables characterization of interference and the likelihood and source of interference. A method of monitoring the entire RFID band according to one embodiment includes sweeping over the entire band with a narrowband reader. By measuring a smaller section of the band and sequentially measuring likewise all of the other sections of the band, the full picture of interference in the RFID band may be put together. With this information, the characterization of interference may be performed, as described below.

According to another embodiment, a system may include one or more high speed A/D's, e.g., single rail or complex architecture, to capture a digital sample stream of the received signal which, after Fourier Transform processing or the like, produces a power spectral density of the RF signal environment. This allows a much faster measurement of the entire RFID band, but the sensitivity of the measurements will typically not be as low as the aforementioned sweeping method.

Characterization of Interference

According to various approaches, narrowband sweeping detection may result in useful information for RFID devices, other than presence of an interference frequency. In one approach, the center frequency may be calculated, e.g., once the left and right edges of the interference frequency are determined e.g., by sweeping. Furthermore, once the left and right edges of the interference frequency are determined, the difference between the left and right edge frequencies may be used to determine the bandwidth.

In another approach, the pulse duration may be calculated, e.g., by conducting a sweep at a slow enough speed, such that the precise times that the pulses switch on and off may be determined. However, if multiple sweeps are performed, the pulse duration information may be overwritten, which would make it no longer possible to determine the pulse duration. To alleviate this, the information from multiple sweeps may be stored in memory with timestamp information.

In still another approach, the pulse repetition rate may be calculated, e.g., by identifying how often the pulse is on and how long it is off; as well as incorporating how regularly the pulse repeats.

According to one approach, the levels between pulses may be calculated, e.g., by determining the power levels in the channel while the interferer is on, and comparing them to the power levels between the pulses. In some cases, the power level may not disappear completely, but rather drop to a lower level when the pulse is off, which constitutes the level between pulses. Moreover, depending on the desired embodiment, power levels may be calculated from pulse to pulse to see if the value varies.

In another approach, if the time block for which the pulses are off is known, then that information may be used to calculate the interference free availability times. Thus the interference free availability times may assist in timing operations such that they are executed during the "off" times, depending on the desired embodiment.

Furthermore, the likely source of interference may be determined, e.g., based on factors including, but not limited to the bandwidth, frequency, durations, etc. According to one illustrative example, the ability to calculate the likely source of interference may be coded into an algorithm, determined from a table or database correlating sources with interference characteristics, etc.

The information and characteristics of the interference, especially the likely source of interference, are useful by enabling implementation of mitigating steps to eliminate or reduce the impact of the interference.

Mitigation of Interference in RFID

According to various approaches, when interference is detected, there are a variety of mitigation methods which may be used.

Forward Link Interference

In one approach, forward link interference mitigation may be implemented. Regarding interference on the forward link over the wider band, if the interference is pulsed on for a period and off for another period, the temporal, interferer-off gaps in the interference may be identified and utilized to conduct RFID communication until the interference returns. Similarly, if the interference is pulsed (e.g., interference changes between higher and lower levels) and/or periodic, a schedule may be made and RFID communication may be performed during the interferer-off times. Furthermore, hibernation timers may be included to singulate tags over multiple periods of interferer off times to find all tags efficiently.

In one approach, if the application use case has the reader fairly close to the tag, sensitivity of the tag may be reduced using the low sensitivity mode. According to an illustrative embodiment, a bit may be added to the ISO Manchester mode Activation, Next, and Deactivate commands which tells the tag to use high sensitivity or low sensitivity modes. By using the low sensitivity setting, the tags may have shorter range, but will be less likely to mistake an interferer for a reader and get stuck in a state for a while.

Reverse Link Interference

In one approach, reverse link interference mitigation may be incorporated. Regarding interference on the reverse link on an adjacent channel, there are a variety of mitigation steps that may be taken. In one example, the backscatter link frequency may be changed to move away from the interferer. According to various approaches, the backscatter link frequency may be changed over a wide range, e.g., from 40 KHz to 640 KHz. In the event that the interference may be at a fixed frequency difference (delta) away, the backscatter link frequency may be adjusted to minimize the impact of the interference.

In another approach, the backscatter creates sidetones (also known as subcarriers) on each side of the main carrier. According to various approaches, the higher frequency, the lower frequency, or combinations of both may be used. In the particular case where interference may be closer to one sidetone than the other, the carrier frequency may be moved such that the interference is not in the same frequency as the backscatter. However, in other embodiments, the sidetone closer to the interference may be ignored, while the sidetone away from the interference may be used for communications.

For interference from other readers, the reader may use only one backscatter sidetone on the opposite side as that of the interferer. As noted above, backscatter creates sidetones on either side of the reader carrier. In an approach for mitigating interference from other readers, the reader may use only one backscatter sidetone that is on the opposite side as that of the interferer. For example, if the interference is on the high side adjacent channel, the low side backscatter may have lower noise from the interferer in the data bandwidth and will have better performance.

One of the most important benefits of detecting interference is to alert the user or a system that tag read performance is compromised due to interference in the immediate area in a very timely manner. The likely source of interference may be indicated if the frequency of the interference is known, determined and/or calculated. Such indication may be output of a type or class of interference sources; a code pre-correlated, e.g., via a table, with such type or class of interference sources; etc. Alerts for automated network alarms may be sent to operators who are monitoring the health of the network and RFID readers.

Furthermore, the user may be alerted that tag read performance is compromised due to interference (e.g., in the reverse link, in the forward link, etc.) in the immediate area in a very timely manner. Furthermore, the likely source of interference and the severity may be indicated.

In any of the embodiments, techniques and/or hardware known in the art may be used to implement the various operations.

Figure 3:
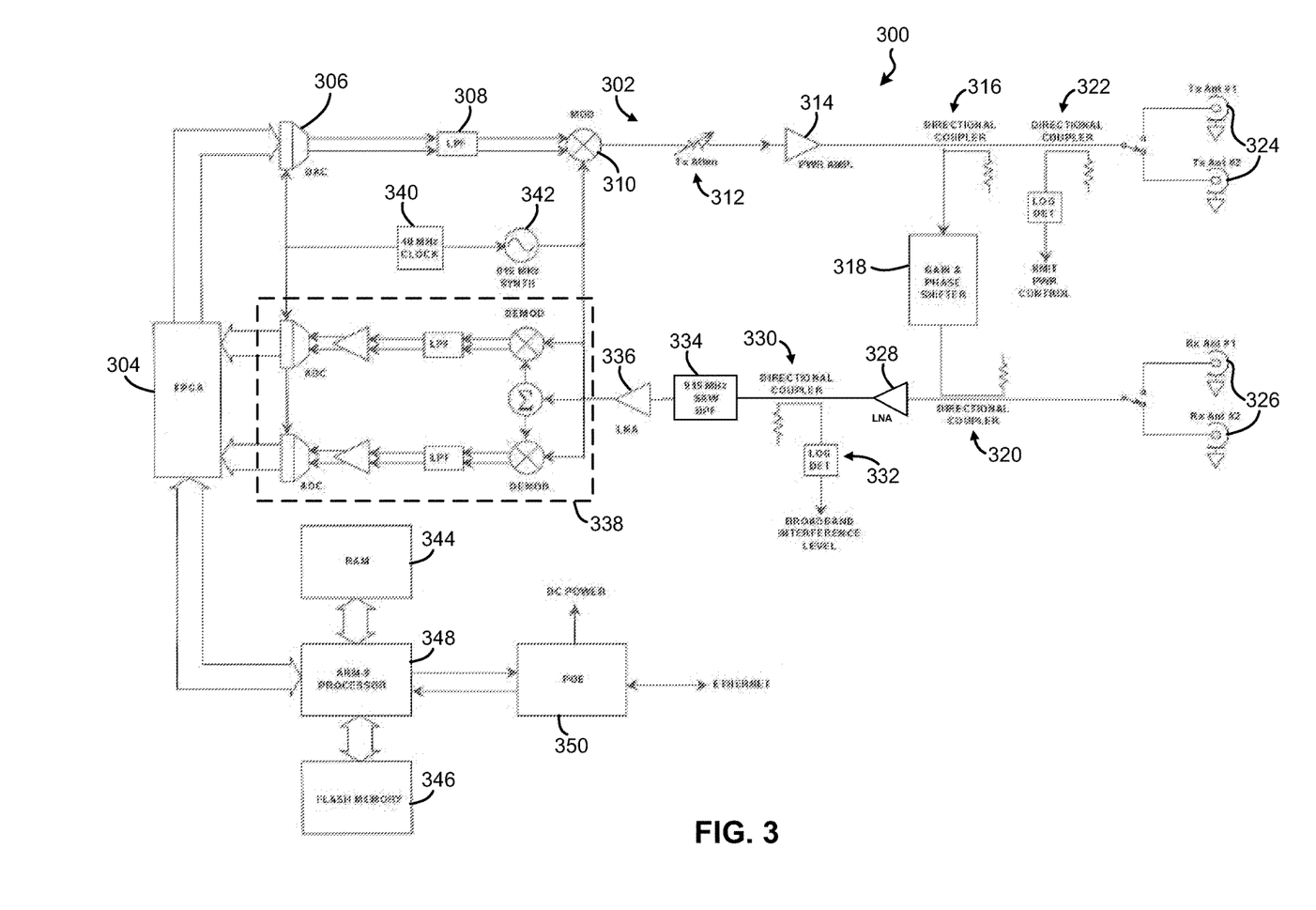
FIG. 3 is a system diagram of an RFID reader according to one illustrative embodiment.

FIG. 3 illustrates one illustrative architecture 300 of a homodyne-type RFID reader. Of course, techniques and various components described herein may be used in other types of RFID reader systems, including heterodyne systems and Low IF systems.

In FIG. 3, the transmit channel 302 extends across the top of the drawing and includes, from the FPGA 304, a digital to analog converter (DAC) 306; a low pass filter (LPF) 308; a modulator (MOD) 310; an attenuator 312; a power amplifier 314; a first directional coupler 316 that, together with the gain and phase shifter 318 and third directional coupler 320 shown directly therebelow provide a carrier cancellation module; a second directional coupler 322 that is part of the transmit power control scheme; and at least one transmit antenna 324. The receive channel includes one or more receive antennas 326; the third directional coupler 320; an amplifier (e.g., LNA) 328; a fourth directional coupler 330 which along with a power detector (e.g., LOG DET) 332 form at least a part of the wideband interference detection circuit that outputs an interference level; a filter (e.g., band pass filter (BPF)) 334; a second amplifier (e.g., LNA) 336; a quadrature baseband downconversion section 338 including demodulators (DEMOD); additional filters (LPF), and analog to digital converters (ADCs). An oscillator (CLOCK) 340 and synthesizer (SYNTH) 342 are also provided. Memory (RAM and FLASH) 344, 346, a processor 348 and a power/communication section (POE) 350 are also present. Additional and/or other components may be present and/or used in various embodiments.

The output of the wideband interference detection circuit may be an analog signal that is proportional to the power detected in the incoming signal. In the embodiment shown, the output is logarithmically proportional thereto. The signal can be fed to the FPGA for processing, e.g., after conversion to a digital signal by an ADC.

The narrowband interference detection may be performed in the FPGA. In operation, the synthesizer sweeps the frequency being fed into the FPGA. The resulting signal is processed by the FPGA to detect the interference.

The broadband interference detection may be performed separately or simultaneously with the narrowband interference detection.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc. A computer readable medium may also include a signal medium such as a wire, network link, wireless link, etc. across which data and/or instructions may be transmitted.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) reader configured to detect radio frequency (RF) interference in and/or outside a band of RFID operation, the RFID reader comprising:
a receive channel for receiving incoming RF signals; and
hardware for detecting interference in and/or outside a band of RFID operation;
wherein the hardware for detecting the interference includes a power detector in the receive channel, and hardware for monitoring an output of the power detector during times when the RFID reader is not transmitting;
wherein the power detector receives power directly from a coupler or splitter at a position prior to an RF bandpass filter, the coupler or splitter being positioned in the receive channel after an amplifier of the receive channel; and
wherein the receive channel is coupled to a quadrature baseband downconversion section including at least one demodulator, at least one filter, and at least one analog to digital converter.

2. The RFID reader as recited in claim 1, further comprising logic for sweeping the power detector over a band of interest, and logic for processing the output of the power detector for detecting a level of interference, wherein all of the hardware for detecting the interference is also used for RFID communication with RFID tags.

3. The RFID reader as recited in claim 1, comprising hardware for mitigating the detected interference by causing the RFID reader to use only one backscatter sidetone for RFID communication, wherein the sidetone used is on an opposite side of a main carrier than the interference.

4. The RFID reader as recited in claim 1, wherein the hardware for detecting the interference includes one or more analog to digital converters configured to output a digital sample stream of a received signal, and logic configured to process the sample stream for producing a power spectral density of an RF signal environment.

5. The RFID reader as recited in claim 1, comprising a second amplifier in the receive channel after the RF bandpass filter.

6. The RFID reader as recited in claim 1, further comprising logic configured to control an aspect of operation of the RFID reader for mitigating the detected interference; and
wherein the logic configured to control the aspect of operation of the RFID reader for mitigating the detected interference includes logic selected from:
logic for identifying temporal gaps in the interference, and for causing RFID communications to be performed during the gaps;
logic for causing the RFID reader to instruct an RFID tag to change to a low sensitivity mode thereof; and
logic for causing a backscatter link frequency to move away from a frequency of interference.

7. The RFID reader as recited in claim 1, further comprising logic configured to alert a user and/or a system that tag read performance is compromised due to interference, wherein a likely source of the interference is indicated at least partially in response to determining a frequency of the detected interference.

8. A method for mitigating radio frequency (RF) interference in and/or outside a band of RFID operation, the method comprising:
detecting interference in and/or outside a band of RFID operation;
controlling an aspect of operation of an RFID reader for mitigating the detected interference, wherein controlling the aspect of operation of the RFID reader includes identifying temporal gaps in the interference, and causing RFID communications to be performed during the temporal gaps in the interference;
receiving power directly from a splitter or coupler at a position prior to an RF bandpass filter, the coupler or splitter being positioned in a receive channel of the RFID reader and immediately adjacent to each of, and between, the RF bandpass filter and after an amplifier of the receive channel; and wherein the receive channel is coupled to a quadrature baseband downconversion section including at least one demodulator, at least one filter, and at least one analog to digital converter.

9. The method as recited in claim 8, wherein if the detected interference is at least one of pulsed and periodic, a schedule of the detected interference is created, and the RFID communications are performed based on the schedule during interferer-off times.

10. The method as recited in claim 8, wherein controlling the aspect of operation of the RFID reader includes performing an operation selected from:
instructing an RFID tag to change to a low sensitivity mode thereof by adding a bit to one or more commands sent to the RFID tag;
causing a backscatter link frequency to move away from a frequency of interference; and
causing the RFID reader to use only one backscatter sidetone for RFID communication, wherein the sidetone used is on an opposite side of a main carrier than the interference.

11. The method as recited in claim 8, further comprising sending an alert to a user and/or a system that tag read performance is compromised due to interference at least partially in response to determining a frequency of the detected interference.

12. The method as recited in claim 8, further comprising determining one or more characteristics of the detected interference, the one or more characteristics being selected from:
left and right edges of the detected interference;
a pulse duration of the detected interference;
a pulse repetition rate of the detected interference; and
a power level of the detected interference.

13. The method as recited in claim 8, wherein detecting the interference comprises:
capturing a digital sample stream of a received signal; and
generating a power spectral density of RF signals in an RF signal environment based on the digital sample stream.

14. The method as recited in claim 8, further comprising determining a likely source of the detected interference based on one or more factors selected from: a bandwidth of the detected interference; a frequency of the detected interference; and a duration of the detected interference.

15. The method as recited in claim 8, comprising causing the RFID reader to ignore one or more backscatter sidetones on a same side of a main carrier as the interference.

16. The RFID reader as recited in claim 1, comprising a second coupler in the receive channel, the second coupler being positioned prior to the amplifier and coupled to a shifter for providing a carrier cancellation module.

17. A Radio Frequency Identification (RFID) reader configured to detect radio frequency (RF) interference in and/or outside a band of RFID operation, the RFID reader comprising:

a receive channel for receiving incoming RF signals; and
hardware for detecting interference in and/or outside a band of RFID operation;
wherein the hardware for detecting the interference includes a power detector in the receive channel, and hardware for monitoring an output of the power detector during times when the RFID reader is not transmitting;
wherein the power detector receives power directly from a coupler or splitter at a position prior to an RF bandpass filter, the coupler or splitter being positioned in the receive channel after an amplifier of the receive channel;
logic configured to determine whether the detected interference is at least one of pulsed and periodic, and in response to detecting the interference is at least one of pulsed and periodic, to create a schedule of the detected interference and cause the RFID reader to perform RFID communications during interferer-off times based on the schedule;
hardware for mitigating the detected interference by causing the RFID reader to use only one backscatter sidetone for RFID communication, wherein the sidetone used is on an opposite side of a main carrier than the interference;
logic configured to alert a user and/or a system that tag read performance is compromised due to interference, wherein a likely source of the interference is indicated;
logic configured to control an aspect of operation of the RFID reader for mitigating the detected interference, wherein the logic configured to control the aspect of operation of the RFID reader for mitigating the detected interference includes logic selected from:
logic for identifying temporal gaps in the interference, and for causing RFID communications to be performed during the gaps;
logic for causing the RFID reader to instruct an RFID tag to change to a low sensitivity mode thereof; and
logic for causing a backscatter link frequency to move away from a frequency of interference; and
wherein the hardware for detecting the interference includes one or more analog to digital converters configured to output a digital sample stream of a received signal, and logic configured to process the sample stream for producing a power spectral density of an RF signal environment; and
wherein the hardware for detecting the interference is further configured to periodically sweep over a predetermined range around a channel of interest and measure changes in signal level.

18. The RFID reader as recited in claim 1, wherein the output of the power detector comprises a broadband interference level of the incoming RF signals.

19. The RFID reader as recited in claim 1, wherein the splitter or coupler is positioned immediately adjacent to each of, and between, the RF bandpass filter and the amplifier of the receive channel.

* * * * *